United States Patent [19]

Desrousseaux

[11] Patent Number: 4,989,164
[45] Date of Patent: Jan. 29, 1991

[54] PROCESS AND DEVICE FOR DETERMINING THE CAMBER OF A SHEET

[75] Inventor: Martine E. Desrousseaux, Peteghem, France

[73] Assignee: TFK, Brande Synthe, France

[21] Appl. No.: 199,700

[22] Filed: May 27, 1988

[30] Foreign Application Priority Data

May 29, 1987 [FR] France ................................ 87 07590

[51] Int. Cl.$^5$ ...................... G06F 15/46; B21B 37/00; H04N 7/18
[52] U.S. Cl. ............................... 364/551.01; 364/472; 364/476; 364/474.13; 364/560; 358/107; 72/12
[58] Field of Search .............. 364/550, 551.02, 551.01, 364/560, 563, 472, 476, 474.09, 474.13; 72/10, 12, 3, 14; 358/101, 106, 107; 73/104, 105

[56] References Cited

U.S. PATENT DOCUMENTS

| | | | |
|---|---|---|---|
| 3,016,460 | 1/1962 | Andresen | 364/563 X |
| 3,573,444 | 4/1971 | Kawabata | 73/105 X |
| 3,843,434 | 10/1974 | Heiks et al. | 364/563 X |
| 4,047,029 | 9/1977 | Allport | 364/563 X |
| 4,221,974 | 9/1980 | Mueller et al. | 364/474.09 X |
| 4,319,270 | 3/1982 | Kimura et al. | 358/101 X |
| 4,360,887 | 11/1982 | Wilson et al. | 358/107 X |
| 4,384,303 | 5/1983 | Brenke et al. | 358/101 X |
| 4,527,243 | 7/1985 | Loose | 364/474.09 X |
| 4,569,024 | 2/1986 | Reichert et al. | 364/474.09 X |
| 4,583,181 | 4/1986 | Gerber et al. | 364/474.09 X |
| 4,633,420 | 12/1986 | Masanobu | 364/472 |
| 4,633,693 | 1/1987 | Tahara et al. | 364/472.2 X |
| 4,677,578 | 6/1987 | Wright et al. | 364/562 |
| 4,687,107 | 8/1987 | Brown et al. | 364/560 X |
| 4,773,029 | 9/1988 | Claesson et al. | 364/562 |

FOREIGN PATENT DOCUMENTS

| | | |
|---|---|---|
| 1005741 | 4/1957 | Fed. Rep. of Germany . |
| 2819395 | 5/1979 | Fed. Rep. of Germany . |
| 1499571 | 10/1967 | France . |
| 2115484 | 7/1972 | France . |
| 57-142502 | 9/1982 | Japan . |
| 58-075008 | 5/1983 | Japan . |
| 58-076704 | 5/1983 | Japan . |
| 59-176608 | 10/1984 | Japan . |
| 60-106610 | 6/1985 | Japan . |
| 0115327 | 6/1985 | Japan ........................................ 72/12 |
| 60-238221 | 11/1985 | Japan . |

OTHER PUBLICATIONS

Measures-Regulation-Automatisme vol. 39, No. 9, Sep. 1974, pp. 23, 25.
Stahl und Eisen vol. 97, No. 19, Sep. 22, 1977, pp. 927–932.
Automation, vol. 14, No. 9, Sep. 1967, p. 17.
Iron and Steel Engineer, vol. 44, No. 3, Mar. 1967.

Primary Examiner—Joseph L. Dixon
Attorney, Agent, or Firm—Fay, Sharpe, Beall, Fagan, Minnich & McKee

[57] ABSTRACT

A device for determining the camber of a sheet includes sensors for taking a reading of the shape of the sheet as well as a system for determing the head, body and foot of the sheet. The device also includes an apparatus for determining a usable region in the body of the sheet. Further provided is a system for calculating, in the usable region, various values permitting the determination of various parameters characterizing the camber of the sheet.

27 Claims, 5 Drawing Sheets

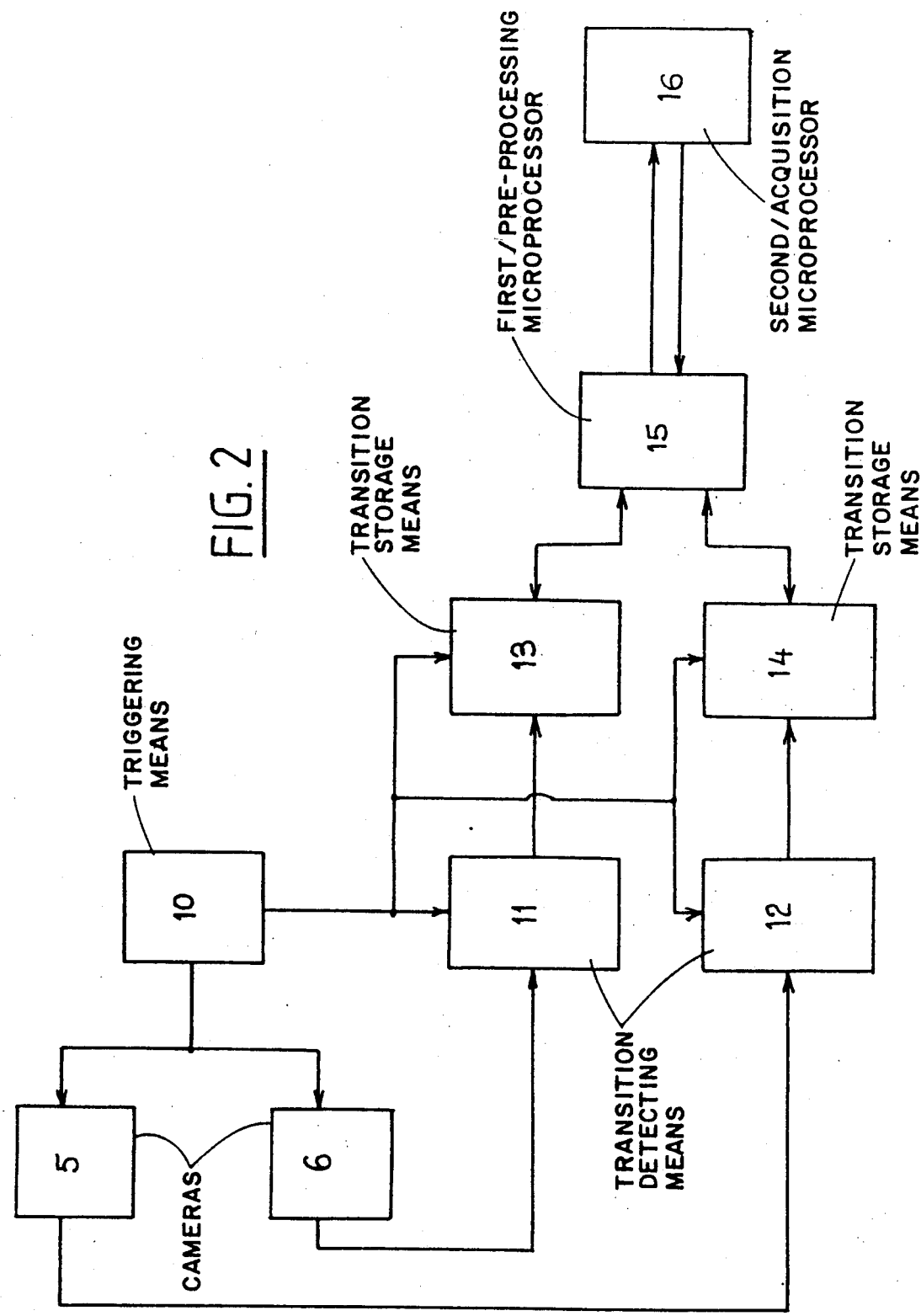

PROCESS AND DEVICE FOR DETERMINING THE CAMBER OF A SHEET

BACKGROUND OF THE INVENTION

The present invention relates to a process for determining the camber or curved deformation of a metal sheet and a device for carrying out said process.

Economical requirements increasingly oblige steel manufacturers to automate their production lines to improve the profitability of their plants.

However, some operations, such as in particular the manufacture of sheets, cannot be completely automated since the shapes of the mother sheets issuing from the rolling mill or planifying machine, differ from one sheet to the other. It is therefore very difficult to automate the rest of the production line since no precise information is available concerning the shape of the sheets.

Furthermore, it is also desirable to know certain characteristics of the sheets resulting from the shape of the latter so as to permit, for example, an adjustment of the rolling mill for eliminating possible defects.

Indeed, the steelworks supplies to the sheet metal shop a semi-product termed bloom. One of the functions of the sheet metal shop is to put the final product in the final dimension according to the specifications of the client.

This operation has several stages:
on the rolling line: the transformation of the bloom into a mother sheet by a hot rolling;
on the shearing line: the cutting out from the mother sheet of one or more daughter sheets. This operation is itself subdivided into two successive parts:
1—the cutting of the edges of the mother sheet so as to provide the width required by the client. This operation is carried out with an edge shearing tool, and
2—the cutting of the mother sheet which has already had its edges cut to size of daughter sheets to the length required by the client. This operation is carried out with a dividing shearing tool.

The shearing operation is carried out according to this procedure provided the mother sheet is sufficiently rectangular to permit inscribing the daughter sheets therein. If the mother sheet is bent, it is necessary to effect a cutting of the mother sheet into sections before cutting its edges. This anomaly disturbs the flow of products in the shearing line, results in increased manufacturing costs and sometimes involves the rejection of the metal.

Now, at the present time, there is no means for industrially measuring the bend in the mother sheet in the plane of the latter, which bend or rise is also termed a camber.

Thus a bent mother sheet reaches the edge shearing station without the operator being previously informed thereof, which all the more disturbs the flow of products.

Furthermore, the camber defect is generally created in the rolling mill when the latter is badly adjusted. Now,
rolling mill operator only has a qualitative idea of
the camber based on his visual appreciation and that of the planar-rendering machine operator. It is therefore very difficult,
at the present time, to determine the ideal adjustment of the rolling mill.

This is all the more true as the bent defect is all the easier to see as the mother sheet is long. It is quite possible not to realize a defect in the adjustment of the rolling mill in a series of short mother sheets and to produce an unacceptable defect in the first long sheet.

An object of the invention is therefore to solve these problems by proposing a process and device which permit characterizing the bent defect by quantitative values which are simple, reliable and relatively inexpensive.

BRIEF SUMMARY OF THE INVENTION

The invention therefore provides a process for determining the c a m b e r of a sheet which comprises the following steps:
the shape of the sheet is read off;
in this sheet three portions respectively corresponding to the head, the body and the foot of the sheet are determined;
a usable region is determined in the body of the sheet, and,
different values are calculated in the usable region for determining different parameters characterizing the c a m b e r of the sheet.

According to another aspect of the invention, the latter provides a device for carrying out the process defined hereinbefore.

BRIEF DESCRIPTION OF THE DRAWINGS

A better understanding of the invention will be had from the following description given solely by way of example with reference to the accompanying drawings in which:

FIG. 2 is a block diagram of a first part of a device according to the invention;

DETAILED DESCRIPTION OF THE PREFERRED EMBODIMENT

As will be described in more detail hereinafter, the process according to the invention comprises taking a reading of the shape of the sheet, determining in the latter three portions respectively corresponding to the head, the body and the foot of the sheet, determining in the body of the sheet a usable region and calculating in the usable region different values permitting the determination of different parameters characterizing the camber or bend of the sheet.

Figure 1:
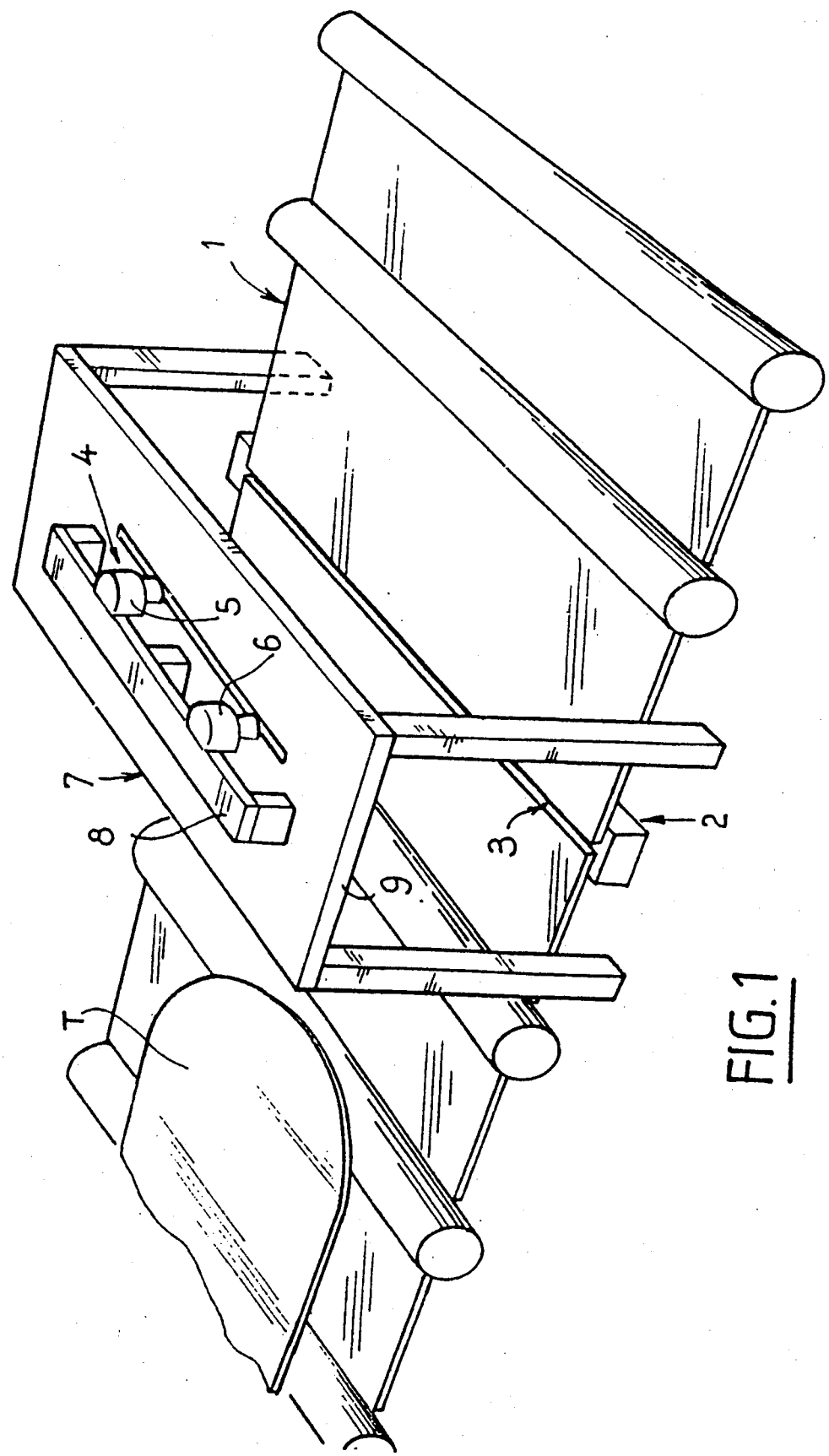
FIG. 1 is an assembly view in perspective of means for taking a reading of the shape of a sheet which is a constituent part of a device according to the invention.

Means for reading or measuring the shape of the sheet are shown in FIG. 1. These means permit reading the shape of a sheet T travelling on a table having rollers 1 along the longitudinal axis of the table, for example at the output end of a planifying machine comprising on each side of the table a source of light 2 extending in confronting relation to a free gap 3 between two consecutive rollers of the table; a detecting means 4 sensitive to the source of light is disposed in confronting relation to said source and is adapted to ascertain the portions of the source of light hidden by the sheet as it travels by. Note that this sheet may be cold or hot (for example it may have a temperature up to 1,000° C.) and that the reading may be effected on the output side of the stand of the rolling mill, in particular for thick sheets, as for example a 4-high stand.

Advantageously, the source of light 2 is disposed under the roller table and extends throughout the width of the latter, while the detecting means are disposed above the table. These detecting means are advantageously composed of two cameras 5 and 6, each having a linear network of photodetectors adjustably fixed on a support means 7 to permit their setting relative to the roller table 1.

Advantageously, each linear network is constituted by a system of 2,048 highly sensitive photodiodes constituting the photodetectors. These cameras are also equipped with various conventional devices such as a lens, a supply board and an electronic board carrying the system of photodetectors and are disposed in protective housings comprising cooling means, for example by the VORTEX effect.

As shown in FIG. 1, the support means 7 comprise for example a beam 8 on which are fixed the two camera housings, this beam being itself supported by a platform 9 fixed to the ground on each side of the roller table.

As mentioned before, the housings of the cameras are adjustably mounted by any known means on the beam 8. This permits achieving a correct positioning of each camera in height relative to the roller table, rendering each system of photodetectors parallel to the plane of the roller table, placing each system in a plane perpendicular to the axis of the table and placing the two systems, in the case where the detecting means comprise two cameras, in the same perpendicular plane.

Furthermore, it should also be noted that each camera comprises known adjusting means permitting the precise positioning of the corresponding system of photodetectors relative to the optical axis of the lens, in particular as concerns the perpendicularity to the optical axis and the centering on this axis.

As will be described in more detail hereinafter, the detecting means are initiated at a given frequency to obtain, for example, successive scrutinizations of the entire sheet as it passes by so as to reconstitute its shape.

Note that these detecting means are also initiated in the absence of a sheet so as to ascertain possible defects in the source of light, these readings of defects being employed for correcting the readings taken upon the passage of the sheet so as to obtain a shape reading which is as correct as possible. For industrial exploitation, in the absence of a sheet, the detecting means are initiated at the given frequency employed for the scrutinization of the sheets.

As shown in FIG. 2, the cameras 5 and 6 are connected to initiating or triggering means 10, for example constituted by any suitable clock for actuating the cameras, and more particularly the systems of photodetectors operating at the given frequency for effecting the desired scrutinizations.

The outputs of the cameras 5 and 6 are connected to means, respectively 11 and 12, for detecting transitions of the photodetectors of the linear systems of cameras. These transition detecting means 11 and 12 are also connected to the initiating means 10 as well as the transition storage means 13 and 14 respectively connected at the output of the transition detecting means 11 and 12.

The outputs of the transition storing means 13 and 14 are connected to a first microprocessor 15 effecting an electronic pre-processing which is itself connected to a second acquisition microprocessor 16. The operations of these microprocessors will be described in more detail hereinafter.

The initiating means 10 activate the detecting means, for example every ten milliseconds so as to effect an analysis of the whole sheet and, for each scrutinization, the outputs of the systems of photodetectors are compared with a threshold under the control of the maximum level of the output signals of the photodetectors, of the preceding scrutinization and obligatorily higher than a minimum threshold. The transition detecting means 11, 12 then compare the output signals of the photodetectors of the scrutinization in process with this threshold and, when the signals change with respect to this threshold, a transition is detected. The number of the photodetectors corresponding to this transition is then available in a diode counter of the transition detecting means as well as the direction of the transition which is processed from the detection variation.

The transitions are then stored in the storage means 13 or 14 constituted for example by memories of the first input/ first output type so as to enable the microprocessor 15 to read these transitions in these storage means under the control of the acquisition microprocessor 16. The transitions acquired by the two cameras during the scrutinization during which the demand occurred are then read and the pre-processing microprocessor 15 transmits the transitions with the numbers of the corresponding photodetectors and their direction to the acquisition microprocessor 16, for example in accordance with a parallel connection protocol.

Figure 3A:
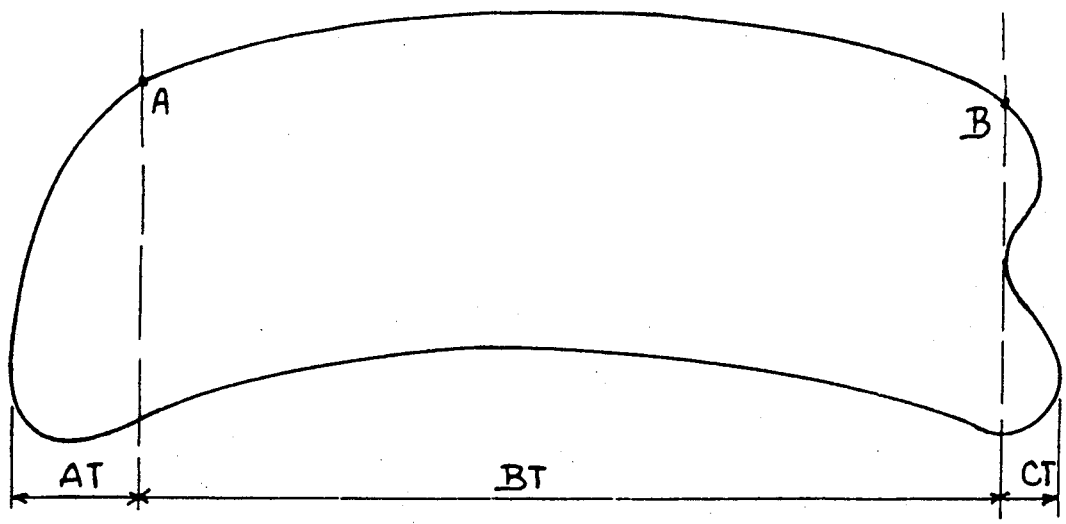
FIGS. 3A, 3B and 3C illustrate different steps of the process according to the invention.

The parameters representing the camber or curvature of the sheet are calculated on a median fiber of the latter. This sheet may have a profile which is affected by end defects which must be eliminated. This is effected in a first stage by cutting the sheet in three regions (FIG. 3A), namely a head carrying the reference AT in this FIGURE, a body BT and a foot CT from criteria described hereinafter which are iteratively applied, starting at the first scrutinization.

Thus, if the scrutinization i comprises for example more than four transitions or if the difference of the portions of the source of light hidden by the sheet between two predetermined scrutinizations i and i - j, is larger than a given threshold, the portion of the sheet on which the scrutinization i was effected pertains to the head AT of the sheet. Note that j is a parameter fixed by the user and may be equal to 1. This same comparison is repeated for the following scrutinizations.

In the case where the difference of the portions of the source of light hidden by the sheet between two predetermined scrutinizations is smaller than the given threshold, the portion of the sheet corresponding to this scrutinization pertains to the body BT of the sheet.

In continuing to scrutinize the sheet, if the scrutinization i has for example more than four transitions, or if the difference of the portions of the source of light hidden by the sheet between the two predetermined scrutinizations is larger than the given threshold, the portion of the sheet corresponding to the scrutinization i and the following scrutinizations pertains to the foot CT of the sheet.

Note that this processing is carried out in real time during the acquisition of the scrutinizations by the acquisition microprocessor 16.

A search is then effected in the body BT of the sheet of a usable region for the calculation of the curvature or camber. This can only be effected in deferred time when the search regions, which will be described in more detail hereinafter have been acquired. At each end of the body of the sheet, the remaining disturbances of the profile of the median fiber are eliminated by applying the following algorithm.

There are first of all determined in the body of the sheet search regions AA', BB' (FIG. 3B) from end points A and B of the body BT of the sheet and by determining points A' and B' on the median fiber of the sheet at a distance d from the end points A, B. This distance d is a parameter which is previously fixed and may be adjusted as desired by the users.

The beginning of the usable region is a point D such that for any point M between A' and D, the rise or camber relative to the chord drawn between A' and M is smaller than a given threshold and for any point M between D and A, the rise or camber relative to the chord drawn between A' and M is larger than this same threshold.

Figure 3B:
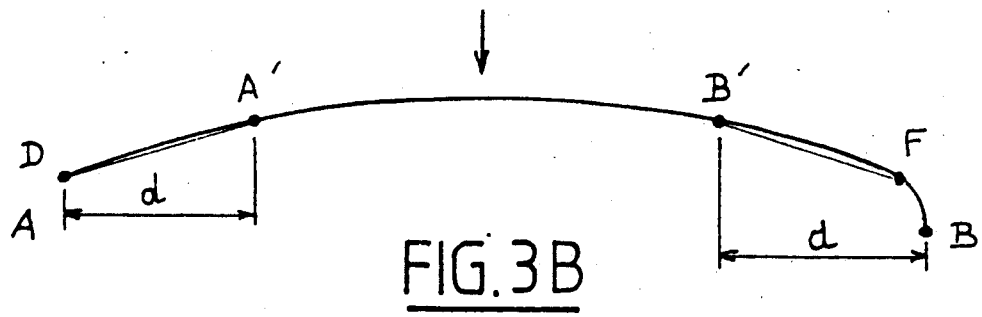

The same algorithm is applied for determining the end of the usable region and obtaining the point F (FIG. 3B). The median fiber is then straightened so as to render the chord D, F parallel to the axis of the roller table. It is then possible to calculate different values in this usable region, these different values permitting the determination of different parameters characterizing the camber of the sheet.

Figure 3C:
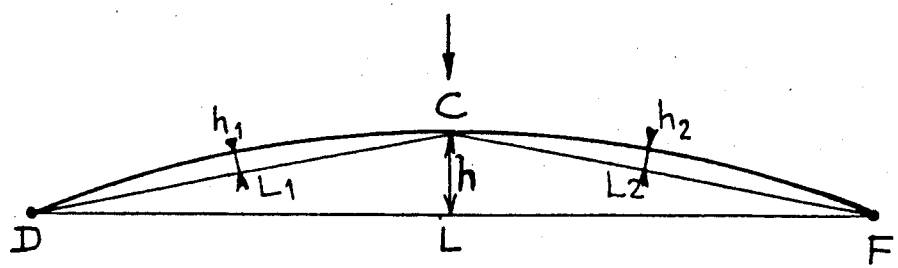

Thus, as shown in FIG. 3C, a principal chord L is drawn and determined between D and F which are the end points of the usable region. The maximum rise or camber h is determined between the median fiber of the sheet and the chord L and this rise determines two secondary chords L1 and L2 respectively, between the points D, C and C, F, C being the point of the median fiber of the sheet where the rise h is maximum. There are also calculated, on one hand, h1, which is the maximum rise between the median fiber of the sheet and the chord of length L1 drawn between D and C and, on the other hand, a rise h2 which is the maximum rise between the median fiber of the sheet and the chord of length L drawn between C and F.

It is then possible with these values to determine certain parameters of the camber which may be constituted for example by the values h, L, h1, L1, h2, L2 and $h/L^2$, $h1/L1^2$ and $h2/L2^2$ which are representative of the curvatures of the sheet. Note that these criteria may easily be modified.

Figure 4:
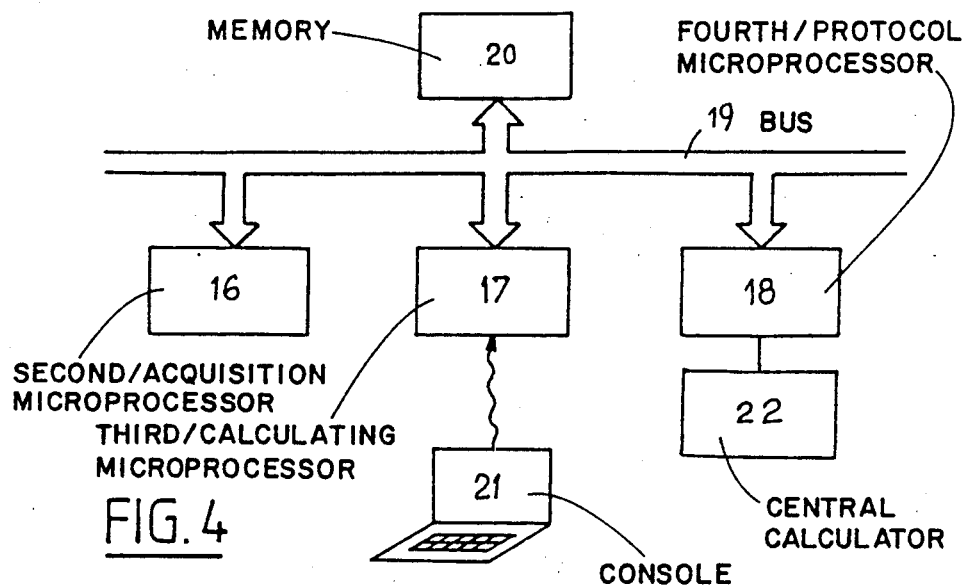
FIG. 4 is a block diagram of a second part of a device according to the invention.

This processing is effected by three microprocessors 16, 17 and 18 (FIG. 4) operating simultaneously and connected to a common bus 19. The data are exchanged through a shared memory 20 also connected to the bus 19.

In the following description, the three microprocessors have been termed, respectively, the acquisition microprocessor 16 already described, a calculating microprocessor 17 and a protocol microprocessor 18.

The principal functions of the acquisition microprocessor are:

the management of the mode of acquisition, of the state of the measuring system, of the number of passes, of the abandonment of a measurement, the acquisition of the transitions by a dialogue with the pre-processing microprocessor 15 and the components associated with the latter, such as those described with reference to FIG. 2.

the interpretation of the acquired transitions as defects of the source or edge of the sheet as a function of the state of the measuring system, in the presence of the product, determination during the acquisition of the regions corresponding to the head, the body and the foot of the sheet, and the calculation of the position of the edges of the sheet with a correction of the parallax due to the thickness of the sheet by effecting a photodiode transition conversion in mm by means of standard constants calculated by the calculating microprocessor 17.

Figure 5:
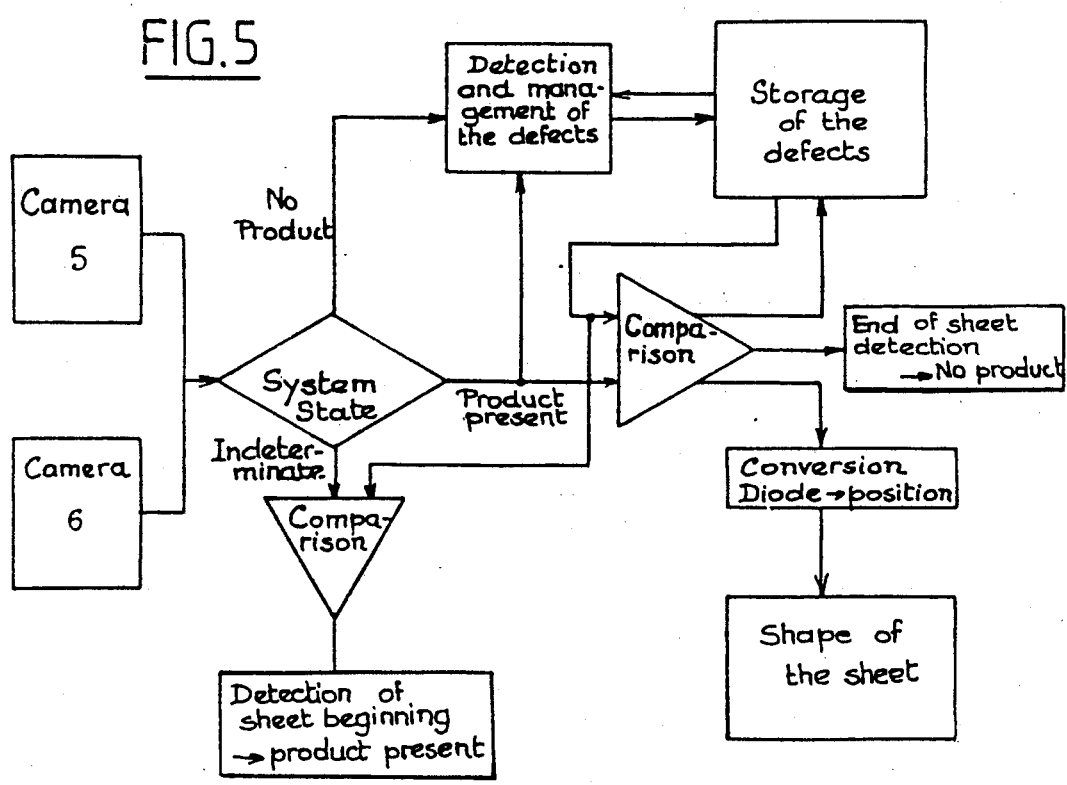
FIG. 5 is a block diagram illustrating the operation of the device according to the invention.

Thus, whether this is illustrated in FIG. 5, at rest, when there is no product being planified, or at the input of the planar-rendering machine, the system is in the "no product" state. In this case, the acquisition mode is said to be "automatic", i.e. periodically an acquisition of the transitions is effected. As no product is present, any transition detected is analyzed as a defect of the source of light. These detected transitions therefore represent either a defect which has already been noted and is therefore confirmed, or a defect which has just appeared and will be validated if it is detected during n successive scrutinizations.

A validated defect which is no longer detected during n successive scrutinizations is eliminated.

When a product appears at the input of the planar-rendering machine, the gauge state becomes "indeterminate" and the acquisition mode is "synchronized" on the speed of the planar-rendering machine.

Thus, each time the rollers of the planar-rendering machine turn for example through 50 mm, an acquisition of the transitions is effected. Upon the first acquisition, such that there exists a detected transition which does not correspond to a noted defect, the beginning of the sheet is detected. The state of the system then becomes "product present". The management of the previously-described defects is then resumed, and solely for the defects which would be located outside the outline of the sheet, i.e. its width plus a safety margin. As the system is in the "product present" state, the determination in real time of the head-body-foot regions of the sheet is effected.

With the acquisition microprocessor 16, the transition of a sheet edge in the neighbourhood of a defect during n consecutive scrutinizations results in the abandonment of the measurement. A changing into reverse also produces this abandonment.

Upon the first acquisition such that there is no detected transition which does not correspond to a noted defect, the end of the sheet is detected. The system then returns to the "no product" state, and the acquisition mode is "automatic".

Validity checking of the measurement is effected in respect of the coherence of the directions of transition, of the verification of the concordance of the detections effected by the two cameras in the overlapping region of the covered fields, of the dimension of the head or foot of the sheet, and of the supervision of the connections between the various elements.

The principal functions of the calculating microprocessor 17 (FIG. 4) are the following:

calculation of the median fiber, determination of the usable region of the sheet and the parameters of the camber, permission of the dialogue on the site, through a keyboard and a console 21, and standardization.

When the acquisition microprocessor 16 has detected the beginning of the body of the sheet, the information or data is transmitted to the calculating microprocessor 17 which then effects in real time the calculation of the median fiber from the positions of the edges worked out by the acquisition microprocessor 16. The determination of the beginning of the usable region is effected on A, A' as soon as the median fiber has been calculated in this portion of the sheet. When the calculation of the median fiber is terminated for the whole body of the product, the calculating processor 17 searches the end of the usable region in B,B' then calculates the different parameters of the camber, however after having, as mentioned before, straightened the median fiber by rendering the chord DF parallel to the axis of the roller table.

In order to facilitate the final adjustment on the site of the measuring apparatus dialogue means, as for example the keyboard and the console 21, may be employed for carrying out the following functions:

modification of the parameters employed in the algorithms of the calculation of the camber in the criteria of the processing of the defects or abandonment, listing of the transitions, detected for each camera, of the positions of the edges, drawing up of the median fibers of the edges in a semigraphical form, total simulation of the passage of a sheet, initiation of n acquisitions and supervision of the dialogue between the various microprocessors, access to all memory data, standardization.

The objects of this standardization are determined automatically:

the gains (mn/photodetector) of each camera and their relative position in order to permit the calculation of the positions of the edges, the number of the diodes located on the optical axis in order to permit the choice of the parallax correction mode.

The protocol microprocessor 18 (FIG. 4) permits:

managing the series connection with a central calculator 22 of the production unit, requesting upon the appearance of a sheet at the input of the planar-rendering machine for example from a central calculator of the production unit, the parameters of this sheet, in particular its number, its width, its length, its thickness, sending in real time by successive messages the median fiber, sending the parameters of the camber or a message of abandonment and possibly sending the shapes of the head, foot and body of the sheet.

The exploitation of the various parameters characterizing the camber may be based on three objectives:

1. Adjusting the rolling mill in order to eliminate the defects of the mother sheets to be produced. Thus, after having detected a bent sheet, the rolling mill operator must take adequate measures on the following products. In order to aid him in this task, a visual support may be provided on a screen in the form of a detailed result of the measurement of the preceding sheet and for example a limited account of the last ten rolled products, so as to be in a position to understand the deviations and evolutions. A more active phase consists in effecting a statistical checking of the process managed by a calculator. This may then warn the rolling mill operator when the camber becomes excessive and indicate to him the corrections to be carried out in the adjustment of the rolling mill.

2. Informing the operator of the completion. This enables him to rapidly know what has to be done in the event of a camber defect. For this purpose, a calculator fed with the measurements effected by the device may test the possibility of inscription of the daughter sheets in the mother sheets, decide possible departures from the line and in this case determine the procedure to adopt. Indeed, it must be arranged that the sheet follow systematically the same circuit, as a camber defect completely upsets the circuit of the sheet and consequently the organization of the workshop even if the latter is completely automatized. Such processing must be carried out before the mother sheet arrives to completion to permit anticipating and taking these measures.

3. Correcting the camber in the planar-rendering machine. It is possible under certain conditions to eliminate the camber defect in the planifying machine. The establishment of planar-rendering instructions requires data from the device according to the invention.

Thus it is clear that the device according to the invention constitutes a tool whose use involves the adaptation of the adjustments of the rolling mill, the rapid management without surprise of the completed bent sheets and lastly the direct correction of the defect.

Figure 6:
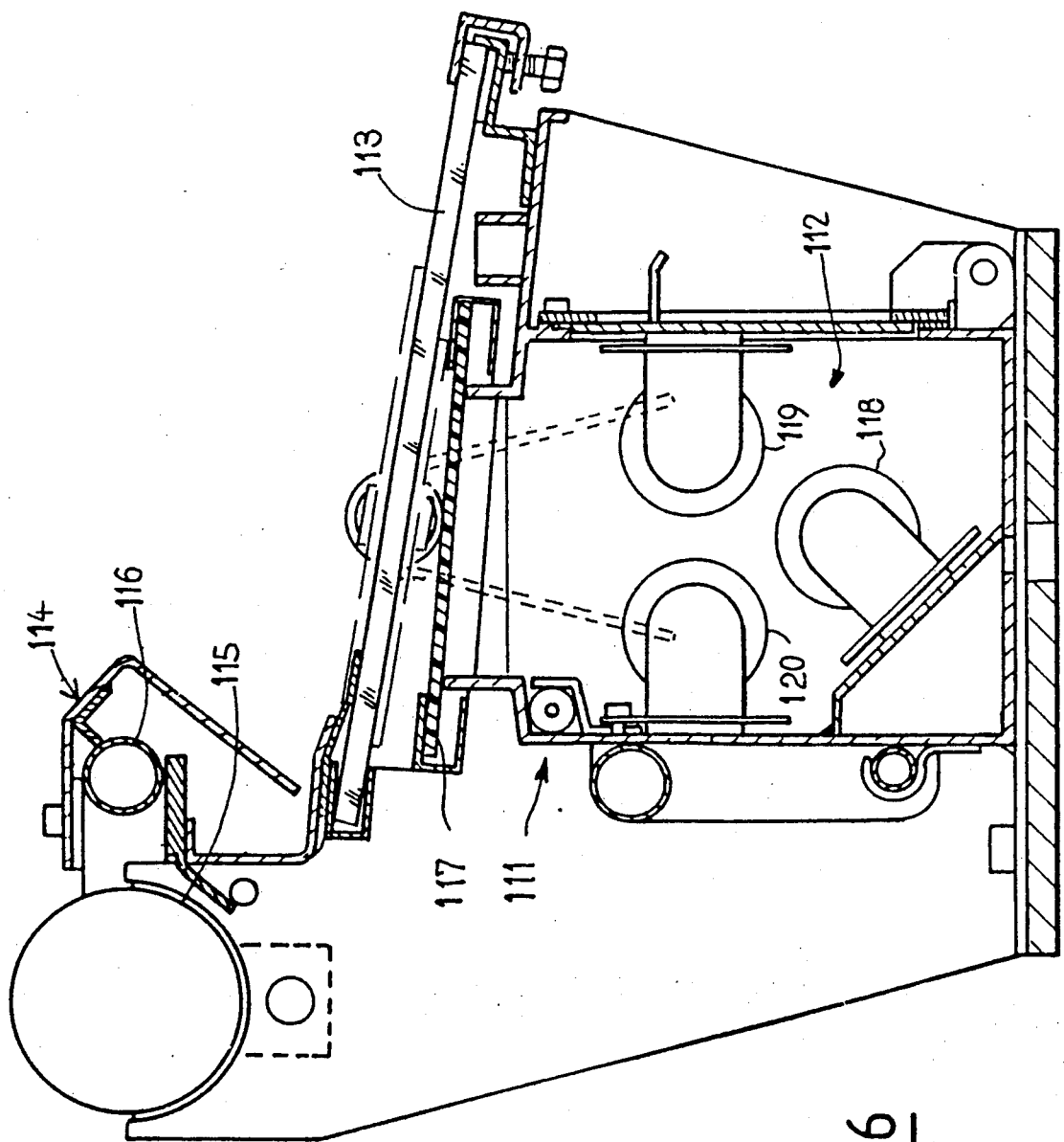
FIG. 6 is a sectional view of a source of light of means for reading the shape of a sheet which is a constituent part of a device according to the invention.

If reference is now made to FIG. 6 which is a sectional view of a source of light, it will be seen that the latter comprises a housing 111 including known cooling means, for example employing the VORTEX effect as for the aforementioned camera housings. In this housing 111 there are disposed light means 112 and the cover of the housing includes at least one plate 113 of transparent material resisting temperature. This device permits taking a reading of the contour for example of cold or hot sheets which may reach a temperature of 1,000° C. This plate 113 is inclined in the direction toward a longitudinal edge of the housing. A means 114 for supplying cooling and cleaning water for said plate are provided on the upper edge of the latter.

The water supply means 114 comprise tubes 115 and 116 which extend along the upper edge of said plate and include orifices equally spaced apart along the length of the tubes.

A plate 117 of a light-diffusing material is interposed in the housing between the light means 112 and the plate 113 of transparent material.

The light means are advantageously formed by three rows 118,119,120 of fluorescent tubes arranged at roughly 120° to one another in the housing. Furthermore, the fluorescent tubes of each of the rows are longitudinally offset with respect to those of the other rows so as to compensate for light losses at the ends of the tubes and illuminate the whole of the height of the photodetectors. This provides a relatively uniform lighting on a length which may be as much as six meters for certain roller tables. Moreover, the use of the plate 117 of light diffusing material, for example of PLEXI-GLASS, permits a homogenization of the light. The plate 113 of a material resisting temperature is formed for example from glass.

The flowing of water from the tubes 115 and 116 onto the plate 113 permits on one hand a cooling of the latter, in particular upon the passage of hot sheets in the vicinity of the source of light and on the other hand discharging of impurities such as for example calamine which would otherwise drop onto this plate and consequently adversely affect the quality of the source of light.

It should also be noted that this housing may be transversely movably mounted with respect to the roller table so as to clear the latter and permit an easier maintenance of the source of light.

Advantageously, the fluorescent tubes emit with a given wavelength, for example in the green colour, and the cameras include selective filters set to this wavelength so as to ensure a sufficient source-sheet contrast for high sheet temperatures and render this contrast insensitive to variations in the surrounding light. Furthermore, the tubes are excited at high frequency to permit the use of relatively short exposure times of the photodetectors.

I claim:

1. Process for determining the camber of a sheet comprising:
    taking a reading of the shape of the sheet,
    determining three portions of the sheet respectively corresponding to a head, a body and a foot of the sheet,
    causing the sheet to travel on conveyor means between a source of light which extends throughout the width of conveyor means and a means for detecting portions of the source of light hidden by the sheet as it travels by, one of said source of light and said means for detecting being disposed above and the other being disposed below the conveyor means,
    initiating the detecting means at a given frequency to obtain successive samplings of the sheet and reconstitute the shape of the sheet,
    determining a variation in portions of the source of light hidden by the sheet between two predetermined samplings and comparing said variation with a given threshold for delimiting the body from the head and the foot of the sheet,
    delimiting at each end of the body of the sheet a search region between a first point (A,B) corresponding to the end of the body (BT) of the sheet and a second point (A',B') located at a given distance (d) from the first point, and determining in said search region a pair of end points (D,F) of the usable region such that for any selected first point (M) located between the second point (A',B') and one end point (D,F) of the usable region of the sheet, a rise between a median fiber of the sheet and a chord drawn between the second point (A'B') and the selected first point (M) is less than a given threshold, and for any selected first point (M) located between the first point (A,B) and the respective end point (D,F) of the usable region of the sheet, a rise between the median fiber of the sheet and a chord drawn between the second point (A',B') and the selected second point (M) is larger than said given threshold, and,
    determining on the body of the sheet a usable region, and calculating in the usable region different values permitting a determination of different parameters characterizing the camber in order to arrive at a measurement of the camber of the sheet.

2. Process according to claim 1, further comprising the steps of:
    determining a number of portions of the light source hidden by the sheet upon each sampling, and
    comparing said number with a given threshold for delimiting the body from the head and the foot of the sheet.

3. Process according to claim 1, further comprising the step of calculating the length (L) of a principal chord between the two end points (D,F) of the usable region, a maximum rise (h) between said chord and the median fiber of the sheet (T), of a pair of secondary chords (L1, L2) between the two ends (D,F) of the usable region and the point (C) of the median fiber of the sheet where the rise (h) is maximum and the maximum rises (h1,h2) between the secondary chords (L1,L2) and the median fiber of the sheet.

4. Process according to claim 1, further comprising the steps of:
    initiating the detection means in the absence of a sheet so as to take a reading of possible defects of the source of light, and
    employing said reading of defects for correcting the reading of the shape of the sheet.

5. Device for carrying out a process for determining the camber of a sheet which includes determining a head, a body and a foot of the sheet, as well as a usable region on the body of the sheet, different values are then calculated to allow a determination of different parameters characterizing the camber in order to arrive at a measurement of camber, said device comprising:
    means for taking a reading of the shape of the sheet,
    means for determining on the sheet three portions respectively corresponding to the head, the body and the foot of the sheet,
    means for determining on the body of the sheet a usable region wherein the means for determining the usable region comprise:
    means for delimiting at each end of the body of the sheet a search region (A-A', B-B') between a first point (A,B) corresponding to a respective end of the body (BT) and a second point (A',B') located at a given distance (d) from the first point (A,B) and
    means for determining in said search region a pair of end points (D,F) of the usable region such that for any selected first point (M) located between the second point (A',B') and an end point (D,F) of the usable region of the sheet, a rise between a median fiber of the sheet and a chord drawn between the second point (A',B') and the selected first point (M) is less than a given threshold and for any selected second point (M) located between the first point (A,B) and the respective end point (D,F) of the usable region of the sheet, the rise between the median fiber of the sheets and a chord drawn between the second point (A',B') and the selected second point (M) is larger than said given threshold, and
    means for calculating in the usable region different values permitting the determination of different parameters characterizing the camber in order to arrive at a measurement of the camber.

6. Device according to claim 5, wherein the means for taking a reading of the shape of the sheet comprise:
    a conveyor means,
    a source of light extending completely across a width of the conveyor means,
    means for detecting portions of the light source hidden by the sheet as it travels by said source of light, and means for initiating at a given frequency the detecting means for obtaining successive samplings of the sheet.

7. Device according to claim 6, wherein the detecting means comprise at least one camera including a linear system of photodetectors.

8. Device according to claim 7, wherein the means for taking a reading comprise detecting means and storage means of transitions of the photodetectors produced by the passage of the sheet between the source of light and the photodetectors of the at least one camera.

9. Device according to claim 5, wherein the means for determining three portions respectively of the sheet corresponding to the head, the body and the foot of the sheet comprise:
means for calculating a difference of portions of the source of light hidden by the sheet between two predetermined samplings and
means for comparing said difference with a given threshold pertaining to one of the head and foot of the sheet, the portions of sheet corresponding to the samplings in respect of which the difference of the hidden portions is larger than said given threshold.

10. Device according to claim 9, wherein the calculating means comprise a microprocessor unit.

11. Device according to claim 5, further comprising means for calculating a number of transitions of each sampling and means for comparing said number with a predetermined threshold for determining whether a portion of the sheet in which the sampling occurs pertains to, or does not pertain to, the body of the sheet.

12. Device according to claim 10, wherein said threshold comprises four transitions.

13. Device according to claim 5 wherein said means for determining comprise a microprocessor unit.

14. Device according to claim 5, comprising means for initiating at a given frequency detecting means in the absence of a sheet so as to take readings of possible defects in the source of light and means for correcting the reading of the shape of the sheet with the possible defects.

15. Device according to claim 14, wherein said initiating means and said correcting means comprise a first microprocessor unit.

16. Device according to claim 15 further comprising:
a protocol microprocessor unit connected to the first microprocessor unit and
a central computer of a production unit, connected to the protocol microprocessor.

17. Device according to claim 6 wherein said source of light is disposed under the roller table and the detecting means are disposed above the roller table.

18. Device according to claim 17, wherein said source of light comprises a housing including cooling means and in which light means are disposed, the cover of the housing comprising at least one plate of temperature resisting transparent material inclined in a direction toward a longitudinal edge of the housing, and means for supplying water for cooling and cleaning said plate, said means being provided on an upper edge of said plate.

19. Device according to claim 18, wherein the water supply means comprise at least one tube extending along the upper edge of said plate and orifices provided in said at least one tube and equally spaced apart along the length of the tube.

20. Device according to claim 18, comprising a plate of light-diffusing material interposed in the housing between the light means and the plate of transparent material.

21. Device according to claim 18, wherein the light means comprise fluorescent tubes emitting at a given wavelength.

22. Device according to claim 21, wherein said light means comprise three rows of fluorescent tubes which are arranged at substantially 120° intervals in relation to one another.

23. Device according to claim 22, wherein the fluorescent tubes of each of the rows are longitudinally offset from the tubes of the other rows.

24. Device according to claim 21, wherein the fluorescent tubes emit green light.

25. Device according to claim 24, wherein said means for detecting portions of light comprises at least one camera and wherein said at least one camera comprises a selective filter corresponding to the given wavelength of the emission of the fluorescent tubes.

26. Device for carrying out a process for determining the camber of a sheet which includes determining a head, a body and a foot of the sheet, as well as a usable region on the body of the sheet, different values are then calculated to allow a determination of different parameters characterizing the camber in order to arrive at a measurement of camber, said device comprising:
means for taking a reading of the shape of the sheet,
means for determining on the sheet three portions respectively corresponding to the head, the body and the foot of the sheet,
means for determining on the body of the sheet a usable region,
means for calculating in the usable region different values permitting the determination of different parameters characterizing the camber in order to arrive at a measurement of the camber, and
means for calculating the length of a principal chord (L) between the two end points (D,F) of the usable region, the length of a maximum rise between said chord and a median fiber of the sheet (T), the length of a pair of secondary chords (L1,L2) between the ends (D,F) of the usable region and a point (C) of the median fiber of the sheet where a rise (h) is largest and the length of maximum rises (h1,h2) between the secondary chords (L1,L2) and the median fiber of the sheet.

27. Device according to claim 26, wherein said calculating means comprise a microprocessor unit.

* * * * *